(12) United States Patent
Bates et al.

(10) Patent No.: US 6,721,781 B1
(45) Date of Patent: Apr. 13, 2004

(54) METHOD OF PROVIDING AN ALTERNATIVE AUDIO FORMAT OF A WEB PAGE IN RESPONSE TO A REQUEST FOR AUDIBLE PRESENTATION OF THE SAME

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/490,661

(22) Filed: Jan. 25, 2000

(51) Int. Cl.[7] ............................ G06F 15/16; H04M 1/64
(52) U.S. Cl. ....................... 709/203; 709/217; 709/219; 379/88.17; 707/1
(58) Field of Search ................................. 709/203, 204, 709/205, 224, 225, 212, 216–219; 704/260, 270.1, 270, 271, 258; 370/352, 354; 707/501.1; 379/88.01, 88.04, 88.22, 88.13, 12, 88.14, 88.17, 93.01, 85, 908, 101.01

(56) References Cited

U.S. PATENT DOCUMENTS

| 5,444,768 A | | 8/1995 | Lemaire et al. | |
| 5,594,658 A | | 1/1997 | Lemaire et al. | |
| 5,613,038 A | | 3/1997 | Lemaire et al. | |
| 5,799,063 A | * | 8/1998 | Krane | 379/88.17 |
| 5,848,415 A | * | 12/1998 | Guck | 707/10 |
| 5,864,870 A | * | 1/1999 | Guck | 707/104.1 |
| 5,899,975 A | * | 5/1999 | Nielsen | 704/270.1 |
| 5,903,727 A | * | 5/1999 | Nielsen | 709/212 |
| 6,233,318 B1 | * | 5/2001 | Picard et al. | 379/88.17 |
| 6,286,031 B1 | * | 9/2001 | Waese et al. | 709/203 |

OTHER PUBLICATIONS

Holms, An email response to question regarding GET/POST HTTP request, extracted from GOOGLE's Newsgroups: php.general, Nov. 11, 2002.*
Raggett "HTML 4.01 Specification", Section 17—Forms, W3C, Dec. 1999.*

* cited by examiner

Primary Examiner—Wen-Tai Lin
(74) Attorney, Agent, or Firm—Roy W. Truelson

(57) ABSTRACT

In accordance with the present invention, a web server supports a client choice of audio or standard video presentation of essentially the same web content. A client passes information requesting web page content in a specific form, preferably as a newly defined argument to the URL called "pagetype". The pagetype may specify that the client wants text only, audio only, or wants both audio and text. Preferably, a new HTML tag "audiate" is defined. An audiate tag in the HTML stream of a web page indicates how an audio version of the web content will be constructed, and optionally indicates the conditions under which the audio version will be played to the user. Specifically, the audiate tag may include one or more optional parameters, among which are one specifying a wave file containing audio content, one specifying HTML elements to be converted to audio, and one specifying a time interval for repeating the audio presentation. The alternative audio format of a web page has many potential uses, including background audio presentation while the user is working on other tasks at a workstation, audio presentation to portable devices, simultaneous audio and video presentation as a teaching tool, and others.

11 Claims, 9 Drawing Sheets

```
<Audiate>

Onpageload  = Y/N
Wave        = name of wave file
elements    = ___, ___, ___
Interval    = time (seconds)
Start-time  = time
Stop-time   = time
duration    = time
condition   = booleum expression
```

Example 1:

`<Audiate Onpageload = "Y" wave = Sounds.wav >`

Example 2:

`<Audiate Onpageload = "Y" elements = textfield1, textfile >`
        `interval = 300`        `duration = 2:00`

FIG. 7

METHOD OF PROVIDING AN ALTERNATIVE AUDIO FORMAT OF A WEB PAGE IN RESPONSE TO A REQUEST FOR AUDIBLE PRESENTATION OF THE SAME

CROSS-REFERENCE TO RELATED APPLICATION

The present application is related to commonly assigned co-pending application Ser. No. 09/490,747, to Cary L. Bates. et al., entitled "Method and Apparatus for Audible Presentation of Web Page Content", filed on the same date as the present application, which is herein incorporated by reference.

FIELD OF THE INVENTION

The present invention relates to the use of the Internet, and in particular, to the manner in which information available on the World Wide Web is formatted for presentation to a user.

BACKGROUND OF THE INVENTION

One of the most remarkable applications of technology we have seen in recent years is the World Wide Web, often known simply as the "web". Nonexistent only a few short years ago, it has suddenly burst upon us. People from schoolchildren to the elderly are learning to use the web, and finding an almost endless variety of information from the convenience of their homes or places of work. Businesses, government, organizations, and even ordinary individuals are making information available on the web, to the degree that it is now the expectation that anything worth knowing about is available somewhere on the web.

Although a great deal of information is available on the web, accessing this information can be difficult and time consuming, as any web user knows. Self-styled prophets of web technology have predicted no end of practical and beneficial uses of the web, if only problems of speed and ease of use can be solved. Accordingly, a great deal of research and development resources have been directed to these problems in recent years. While some progress has been made in the form of faster hardware, browsers which are more capable and easier to use, and so on, much improvement is still needed.

Nearly all web browsers follow the paradigm of a user visually examining web content presented on a display. I.e., typically a user sits in front of a computer display screen, and enters commands to view web pages presented by the user's browser. A great deal of effort is expended in the formatting of web pages for proper visual appeal and ease of understanding. The browser may run in a window, so that the user may switch back and forth from the browser to some other tasks running in other windows. But it is usually expected that when the user is viewing a web page in the browser, his entire attention will be directed thereto, and other tasks will be foreclosed.

Because the web evolved out of the world of computers, it was natural that web interfaces for users evolve from computer interfaces, specifically, computer graphics presentation. While this paradigm has its place, it severely limits the potential applications for the use of web information. In general, there has been a lack of recognition of the fact that there is a great deal of information available on the web, which need not be presented to the user in such a manner. Specifically, much of the information available on the web could be audibly presented to a web user. Audible presentation has the advantage of not requiring the user's undivided attention. Moreover, if means for facilitating audible presentation of web content were more readily available, it is likely that additional web content directed to this use might become available.

Audible presentation of certain web content is known, but the capabilities of existing audible presentation are primitive. Scattered audio clips are imbedded in some web pages. These clips may be selected from a browser, with the result that the audio is played at the user's workstation. Not only is the information content thus available extremely limited, but like other web content intended for presentation from a browser executing on a workstation, it is expected that such audio clips will be played while the user's full attention is directed to the browser session on the interactive workstation.

An unrecognized need exists for alternative methods and apparatus for presenting web content to the user, which are less disruptive of other tasks in which the user may be engaged. Specifically, an unrecognized need exists for methods and apparatus supporting improved and more extensive audible presentation of web content.

SUMMARY OF THE INVENTION

In accordance with the present invention, a web server supports a client choice of audio or standard video presentation of essentially the same web content. A client passes information requesting web content in a specific form, and the web server responds with the appropriate form.

In the preferred embodiment, a new HTML tag "audiate" is defined. An audiate tag in the HTML stream of a web page indicates how an audio version of the web content will be constructed, and optionally indicates the conditions under which the audio version will be played to the user. Specifically, the audiate tag may include one or more optional parameters, among which are one specifying a wave file containing audio content, one specifying HTML elements to be converted to audio, and one specifying a time interval for repeating the audio presentation.

In the preferred embodiment, the client passes a newly defined argument to the URL (called "pagetype") when requesting a web page. The pagetype may specify that the client wants text only, audio only, or wants both audio and text. In addition, the pagetype may specify whether an audibly formatted version of the page should be sent in the absence of an audiate HTML statement.

The alternative audio format of a web page has many potential uses. Web page content may be audibly presented in the background of a workstation while the user is working on other tasks, specifically, may be audibly presented at intervals or when content changes. Web page content may be transmitted to a special portable device, which has limited or no video display capabilities, for audio presentation while the user is driving a car, walking, gardening, performing chores, etc. Web page content may be audibly presented to visually impaired individuals. Simultaneous audible and visual presentation of the same content may be useful for individuals learning to read, or for learning a second language. Numerous other potential uses may exist.

The details of the present invention, both as to its structure and operation, can best be understood in reference to the accompanying drawings, in which like reference numerals refer to like parts, and in which:

BRIEF DESCRIPTION OF THE DRAWING

FIG. 7 illustrates the syntax of the audiate HTML tag, according to the preferred embodiment.

DETAILED DESCRIPTION OF THE PREFERRED EMBODIMENT

OVERVIEW

Figure 1:
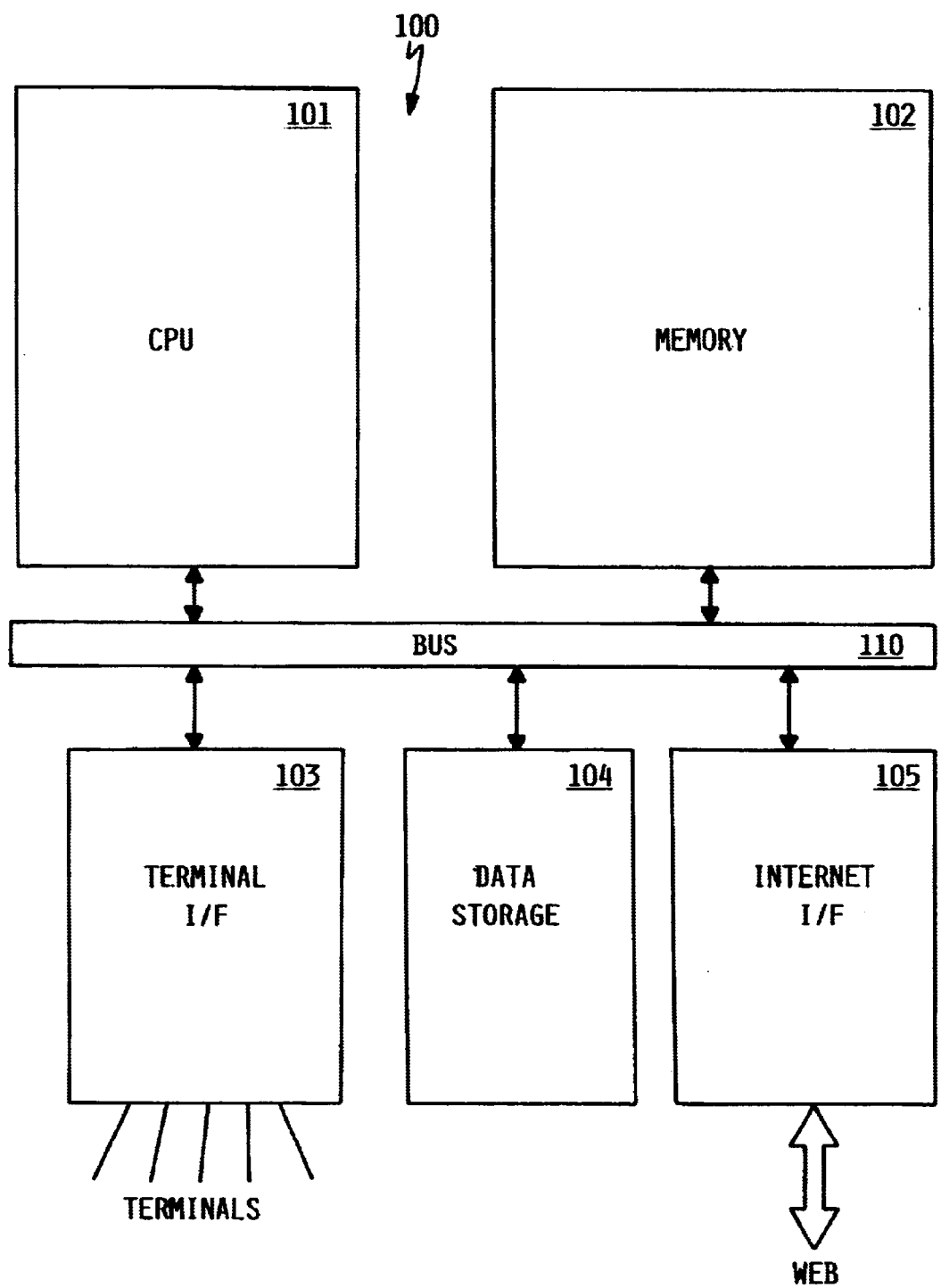
FIG. 1 is a high-level block diagram of a web server computer system, according to the preferred embodiment of the present invention.

Prior to discussing the operation of embodiments of the invention, a brief overview discussion of the Internet is provided herein.

The term "Internet" is a shortened version of "Internetwork", and refers commonly to a collection of computer networks that utilize the TCP/IP suite of protocols, well-known in the art of computer networking. TCP/IP is an acronym for "Transport Control Protocol/Internet Protocol", a software protocol that facilitates communications between computers.

Networked systems typically follow a client server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the server itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered, electronic information to the user as server response to the client process. The client process may be active in a first computer system, and the server process may be active in a second computer system; the processes communicate with one another over a communications medium that allows multiple clients to take advantage of the information gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW), or simply, the "web", includes all servers adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office. The URL specifies a hypertext transfer protocol ("http") and a name ("www.uspto.gov") of the server. The server name is associated with a unique, numeric value (i.e., a TCP/IP address). The URL also specifies the name of the file that contains the text ("intro.html") and the hierarchical directory ("web") and subdirectory ("menu") structure in which the file resides on the server.

Active within the client is a first process, known as a "browser, that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, chat-rooms, and video objects. A web page can be constructed by loading one or more separate files into an active directory or file structure that is then displayed as a viewable object within a graphical user interface.

DETAILED DESCRIPTION

Referring to the Drawing, wherein like numbers denote like parts throughout the several views, FIG. 1 shows a high-level block diagram of a server computer system 100 acting as a web page server, consistent with the preferred embodiment. Computer system 100 comprises central processing unit (CPU) 101, main memory 102, terminal interface 103, data storage 104, and internet interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Terminal interface 103 may support the attachment of a single or multiple terminals, and may be implemented as one or multiple electronic circuit cards or other units. Data storage 104 preferably comprises one or more rotating magnetic hard disk drive units, although other types of data storage could be used. Internet interface 105 provides a physical connection for transmission of data to and from the Internet, and could use any of various available technologies. Communications bus 110 supports transfer of data, commands and other information between different devices; while shown in simplified form as a single bus, it is typically structured as multiple buses, and may be arranged in a hierarchical form. The computer system shown in FIG. 1 is intended to be a simplified representation, it being understood that many variations in system configuration are possible in addition to those specifically mentioned here. While system 100 could be a personal computer system, it could also be a larger computer system such as an IBM Enterprise System or an IBM AS/400 system.

Figure 2:
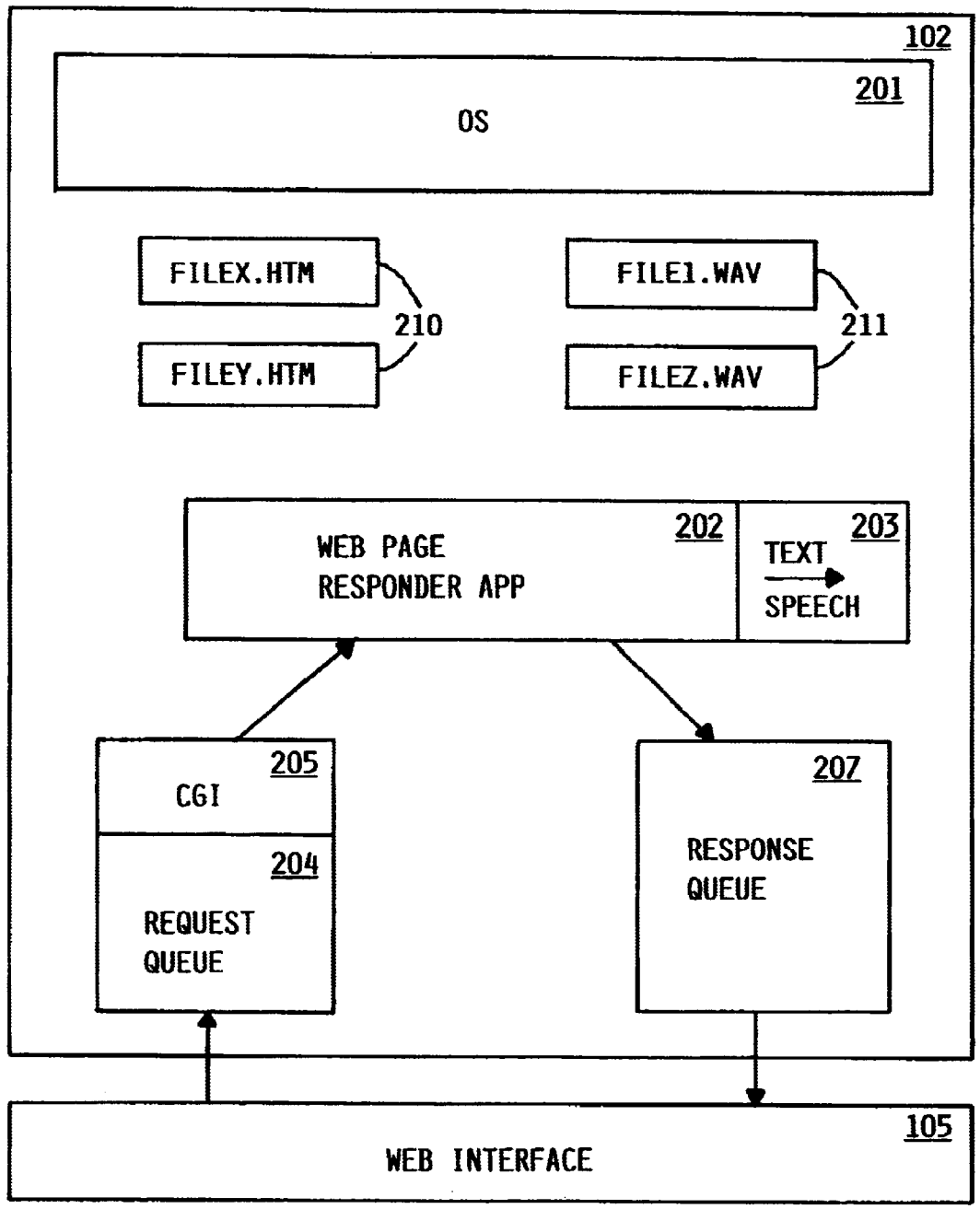
FIG. 2 is a conceptual illustration of the major software components of a server computer system for servicing search requests on the web, in accordance with the preferred embodiment.

FIG. 2 is a conceptual illustration of the major software components of server system 100 in memory 102. Operating system 201 provides various low-level software functions, such as device interfaces, management of memory pages, management of multiple tasks, etc. as is well-known in the art. Web page responder application 202 constructs responses to requests for web pages coming received from clients, as more fully described herein. Web page responder may access HTML files 210 and/or wave files 211 to construct a response. Each HTML file 210 contains HTML script defining a web page. Each wave file 211 contains a digitized audio record which can be recognized and played by a browser at the client. Two HTML files 210 and two wave files 211 are shown in FIG. 2 by way of example, it being understood that the number of such files may vary, and that there may in fact be no such files present on server system 100, the necessary data being obtained from other computer systems, or being algorithmically constructed from other data.

Web responder 202 also preferably includes a text-to-speech conversion function 203 for rendering text in audible form. While this is shown in the preferred embodiment as part of the web responder 202, the function of converting text to speech as described more fully herein could also be performed by a stand-alone application residing in memory 102, or a separate text-to-speech conversion device attached to server 100, having its own processor, memory, and other necessary hardware.

Request queue 204 temporarily stores requests received over the Internet from various clients. Common Gateway Interface (CGI) 205 acts as a request dispatcher, removing requests from the queue and initiating processes in response to the requests. Depending on the server configuration, it is possible that many different types of requests are received and serviced, not all of which are requests for a web page at a particular URL. Therefore CGI 205 is shown as having multiple output paths, it being understood that computer system 100 may instead be a dedicated web page server which does nothing but transmit web pages. Responder 202 receives a request dispatched by CGI 205, builds a response, an places the formatted web page response on response queue 207, from which it is transmitted by web interface 105 over the Internet to the requesting client.

While the software components of FIG. 2 are shown conceptually as residing in memory, it will be understood that in general the memory of a computer system will be too small to hold all programs and data simultaneously, and that information is typically stored in data storage 104, comprising one or more mass storage devices such as rotating magnetic disk drives, and that the information is paged into memory by the operating system as required.

Server computer 100 and its components are shown and described in FIGS. 1 and 2 as a more or less single, self-contained computer system. It is possible to implement a web server in such a manner. It is alternatively possible to use multiple computer systems, particularly multiple systems which share a single large database, each having a specialized task. For example, one or more computer systems could be dedicated to database maintenance, while one or more other computer systems are dedicated to servicing requests received from clients. References herein to a "server" or "web page server" should be understood to include either a single computer or a collection of computer systems which respond to such web page requests.

Figure 3:
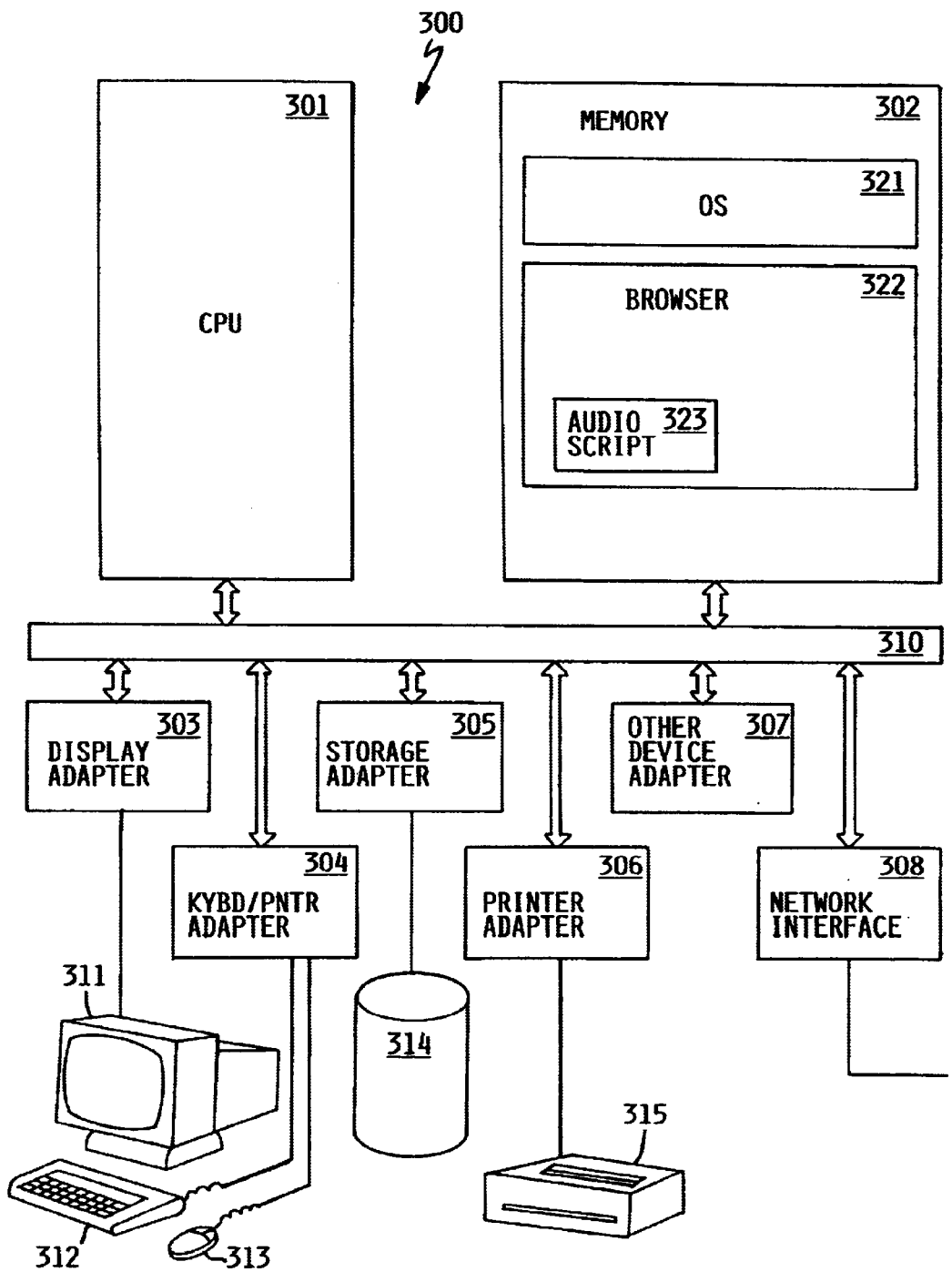
FIG. 3 is a high-level block diagram of a typical client computer system from which web search requests are submitted, according to the preferred embodiment.

FIG. 3 illustrates a typical client computer system 300 from which web requests are submitted, according to the preferred embodiment. Client computer system 300 includes CPU 301, main memory 302, various device adapters and interfaces 303–308, and communications bus 310. CPU 301 is a general-purpose programmable processor, executing instructions stored in memory 302; while a single CPU is shown in FIG. 3, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communications bus 310 supports transfer of data, commands and other information between different devices; while shown in simplified form as a single bus, it may be structured as multiple buses, and may be arranged in a hierarchical form. Display adapter supports video display 311, which is typically a cathode-ray tube display, although other display technologies may be used. Keyboard/pointer adapter 304 supports keyboard 312 and pointing device 313, depicted as a mouse, it being understood that other forms of input devices could be used. Storage adapter 305 supports one or more data storage devices 314, which are typically rotating magnetic hard disk drives, although other data storage devices could be used. Printer adapter 306 supports printer 315. Adapter 307 may support any of a variety of additional devices, such as CD-ROM drives, audio devices, etc. Network interface 308 provides a physical interface to the Internet. In a typical personal computer system, this interface often comprises a modem connected to a telephone line, through which an Internet access provider or on-line service provider is reached. However, many other types of interface are possible. For example, computer system 300 may be connected to a local mainframe computer system via a local area network using an Ethernet, Token Ring, or other protocol, the mainframe in turn being connected to the Internet. Alternatively, Internet access may be provided through cable TV, wireless, or other types of connection. Computer system 300 will typically be any of various models of single-user computer systems known as "personal computers". The representation of FIG. 3 is intended as an exemplary simplified representation, it being understood that many variations in system configuration are possible in addition to those mentioned here. Furthermore, a client requesting a web page in accordance with the present invention need not be a personal computer system, and may be a larger computer system, a notebook or laptop computer. Finally, such a client need not be a general-purpose computer system at all, but may be a special-purpose device for accessing the web, such as an Internet access box for a television set, or a portable wireless web accessing device.

As shown in FIG. 3, operating system 321 and browser 322 reside in memory 302. Operating system 321 provides various low-level software functions, such as device interfaces, management of memory pages, management of multiple tasks, etc. as is well-known in the art. Browser 322 provides a user interface to the web. Browser 322 may be integrated into operating system 321, or may be a separate application program. Browser 322 optionally maintains an audible presentation script file 323 which governs the playing of audio content from the web, as explained more fully herein.

Figure 4:
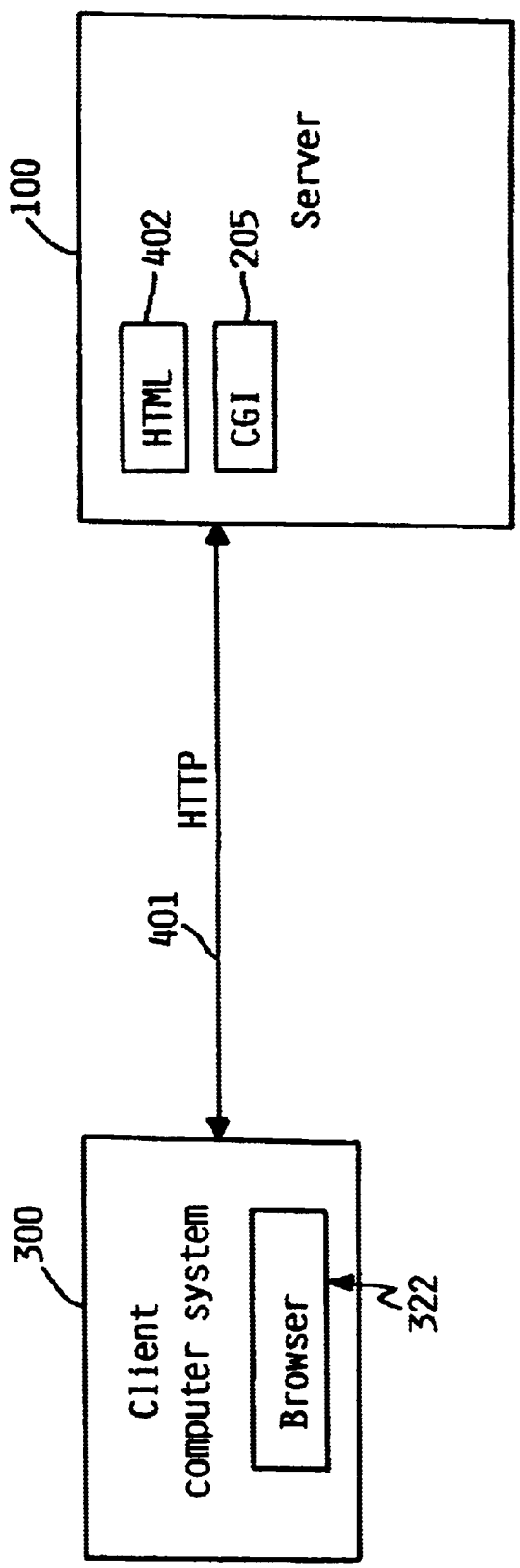
FIG. 4 is a block diagram illustrative of a client/server architecture, according to the preferred embodiment.

FIG. 4 is a block diagram illustrative of a client/server architecture. Client system 300 and server system 100 communicate by utilizing the functionality provided by HTTP. Active within client system 300 is browser 322, which established connections with server 100 and presents information to the user. Server 100 executes the corresponding server software, which presents information to the client in the form of HTTP responses 401. The HTTP responses correspond to the web pages represented using HTML or other data generated by server 100. Server 100 generates HTML document 402, which is a file of control codes that server 100 sends to client 300 and which browser 322 then interprets to present information to the user. Server 100 also provides Common Gateway Interface (CGI) program 205, which allows client 300 to direct server 100 to commence execution of the specified program contained within server 100. In the preferred embodiment, an example of one such specified program is responder program 202, as described more fully herein. CGI program 205 executes on CPU 101. Referring again to FIG. 4, using the CGI program and HTTP responses 401, server 100 may notify client 300 of the results of that execution upon completion. Although the protocols of HTML, CGI and HTTP are shown, any suitable protocols could be used.

Figure 5:
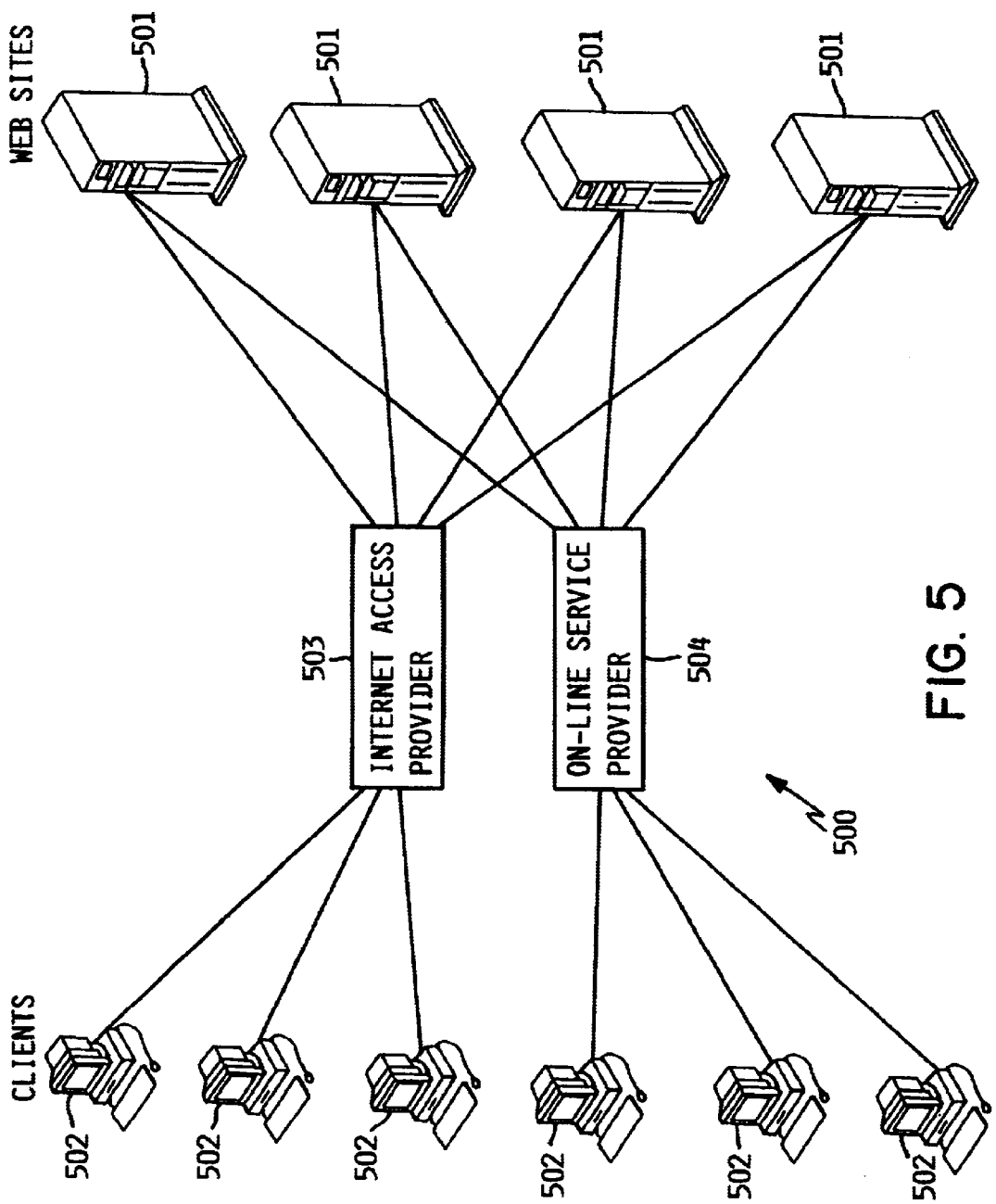
FIG. 5 is a simplified representation of a computer network such as the Internet, according to the preferred embodiment.

FIG. 5 is a simplified representation of a computer network 500. Computer network 500 is representative of the Internet, which can be described as a known computer network based on the client-server model discussed herein. Conceptually, the Internet includes a large network of servers 501 (such as server 100) that are accessible by clients 502, typically computers such as computer system 300, through some private Internet access provider 503 or an on-line service provider 504. Each of the clients 502 may run a respective browser to access servers 501 via the access providers. Each server 501 operates a so-called "web site" that supports files in the form of documents or pages. A network path to servers 501 is identified by a Universal Resource Locator (URL) having a known syntax for defining a network connection. While various relatively direct paths are shown, it will be understood that FIG. 5 is a conceptual representation only, and that a computer network such as the Internet may in fact have a far more complex structure.

In accordance with the preferred embodiment of the present invention, a web server supports a client choice of audio or standard video presentation of essentially the same web content. In order to support this capability, a new argument to the URL, called "pagetype" is defined. The client passes the pagetype with the URL when requesting a web page. The pagetype may specify that the client wants text only, audio only, or wants both audio and text. In addition, the pagetype may specify whether an audibly formatted version of the page should be sent in the absence of an audiate HTML statement.

Figure 6:
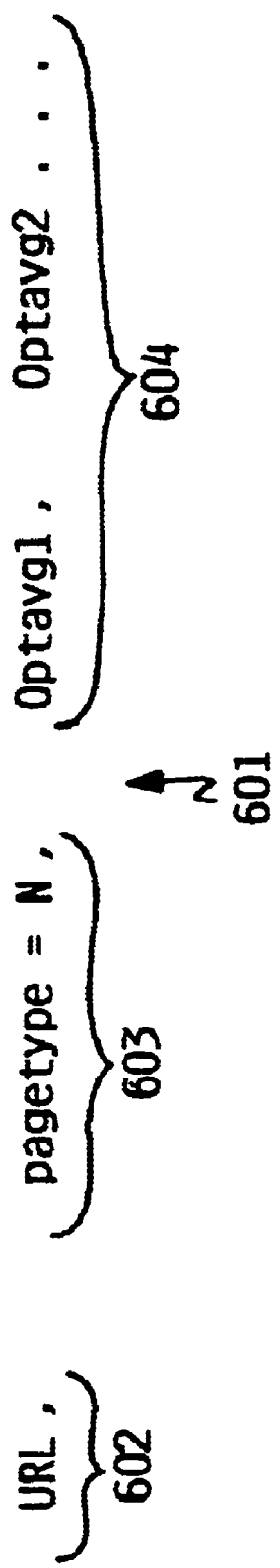
FIG. 6 illustrates a typical page request using a pagetype argument, the page request being sent from a client to a web page server, according to the preferred embodiment.

FIG. 6 illustrates a typical request 601 running from a client to a web page server. The request 601 includes URL 602 identifying the server which is the destination of the request, pagetype argument 603 specifying the audio or video format of the response, and may include additional optional arguments 604. Pagetype assumes an integer value between 0 and 4, having the following defined meanings:

0 Conventional HTML text only (without audio)

1 Audio (specified by audiate) only (without HTML text)

2 Both audio (specified by audiate) and HTML text

3 Convert HTML to audio and send audio only

4 Convert HTML to audio, and send both audio and HTML text

Audiate is a newly defined HTML tag, as explained below. A pagetype argument of 0 corresponds to a response formatted according to conventional practice. Therefore, to assure compatibility with older browsers, server 100 assumes a pagetype of 0 if no pagetype is specified.

While it would be possible to support client specification of audio vs. video (HTML text) format without any additions to conventional HTML syntax, in the preferred embodiment a new HTML tag, "audiate", is defined. An audiate tag in the HTML stream of a web page indicates how an audio version of the web content will be constructed, and optionally indicates the conditions under which the audio version will be played to the user.

FIG. 7 illustrates the syntax of the audiate HTML tag. An audiate HTML statement begins with the word "audiate", followed by one or more optional parameters. These Parameters include onpageload, wave, elements, interval, start_time, stop_time, duration and condition, it being understood that additional parameters could be defined to specify additional formats, conditions, etc. Onpageload is a flag indicating whether the audio will be played upon loading the web page at the browser. Wave specifies the name of a wave file containing audio content. Elements specify text fields to be converted to audio format. Interval specifies an interval for repeating an audio presentation; if no interval is specified, the audio is presented only once. Start_time specifies a time at which audio presentation is to begin; if no start_time is specified, it is assumed to be immediately. Stop_time specifies a time at which audio presentation is to end; if no stop time is specified, the audio presentation repeats indefinitely at the specified interval, or if no interval is specified, the audio presentation is made only once. Duration specifies the duration of the audio presentation; duration is an alternative to using stop_time, and might be used, e.g., where the presentation is to begin upon loading and to continue for the specified time duration. Condition specifies a boolean expression which is a condition on the repeating of the audio presentation; the most common condition would be that the web page had changed, but it would be possible to express other more complex conditions.

Two examples of audiate statements are shown in FIG. 7. In example 1, an audiate statement calls for the one-time audible presentation of the audio content from wave file "sounds.wav", this one-time presentation to occur upon loading the web page containing the audiate statement. In example 2, the audiate statement specifies conversion of text from textfield1 and textfield2 to audio, and the audible presentation of this converted text upon page load, and thereafter at intervals of 300 seconds, for a duration of 2 hours.

Figure 8A:
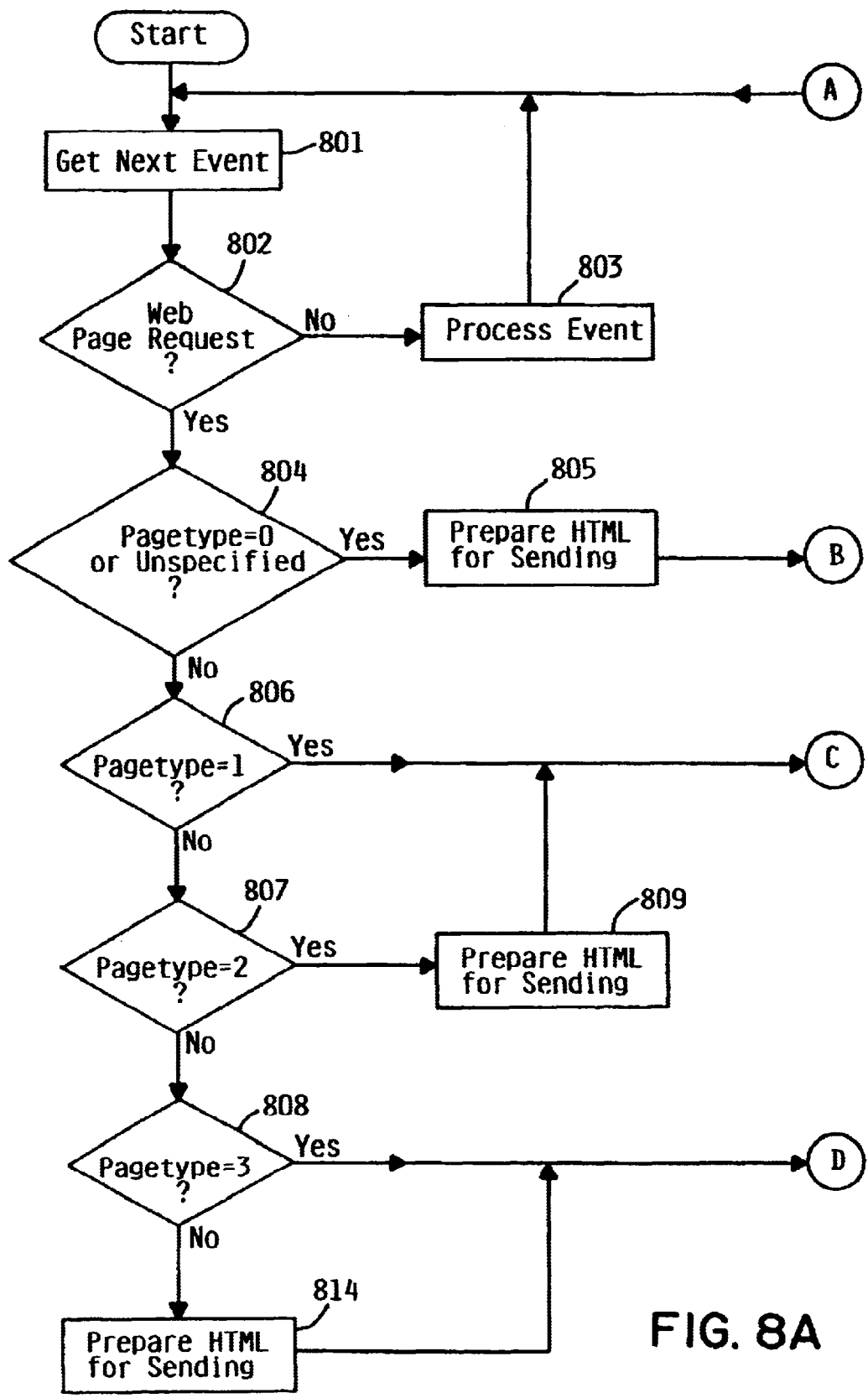
FIG. 8 is a high-level flow diagram of the steps performed by the responder application in the web page server, according to the preferred embodiment.
Figure 8B:
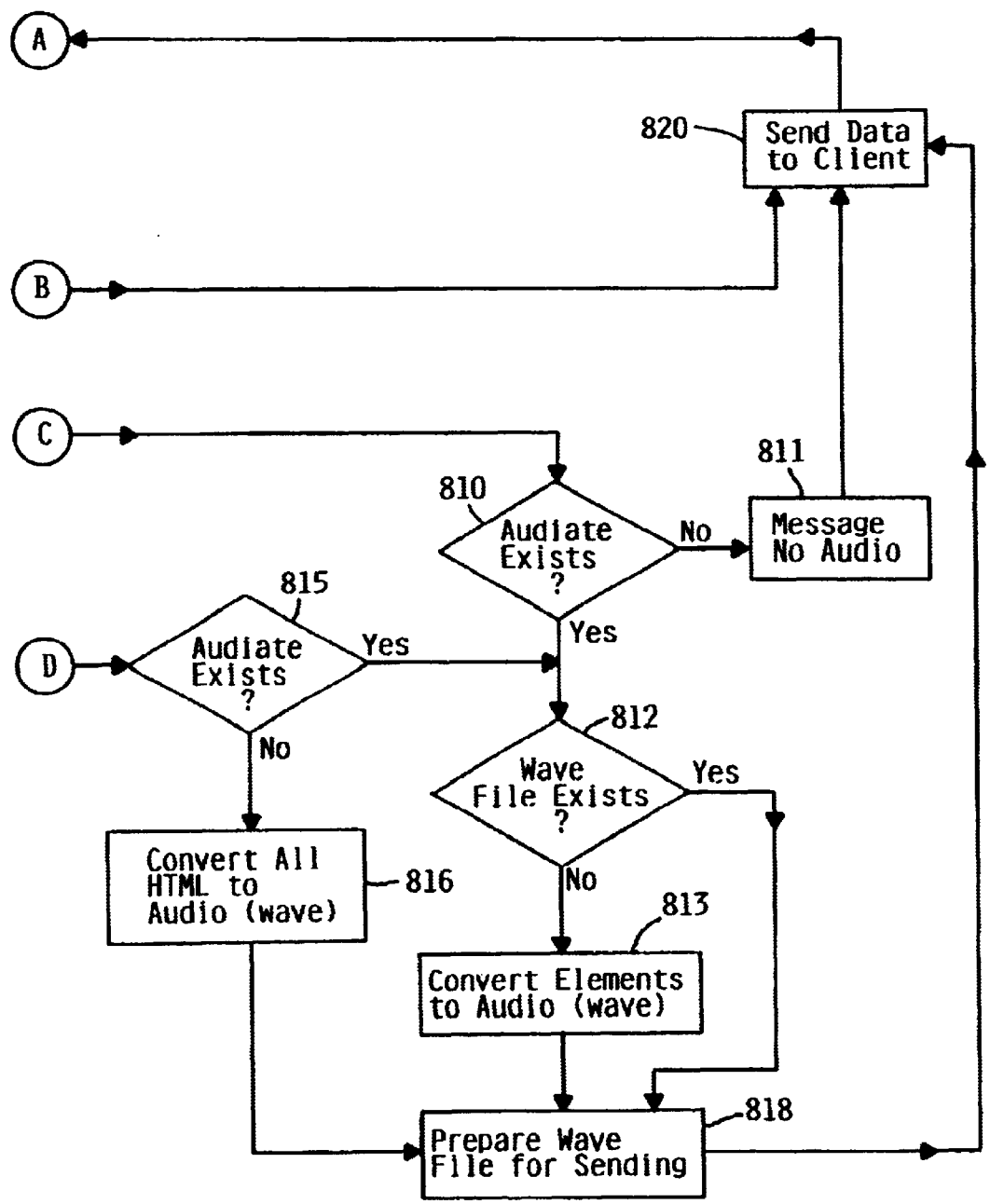

FIG. 8 is a high-level flow diagram of the steps performed by responder application 202 in server 100, in accordance with the preferred embodiment. As shown, the responder 202 receives an event at step 801. As explained previously, the primary function of responder 202 is to generate responses to client requests for web pages. Therefore, it is expected that many of the "events" will be requests coming from request queue 204 and CGI 205 to provide web page data on behalf of a requesting client. However, it is possible that responder application must perform other tasks, such as update statistical or bookkeeping data, update web page information, process errors, etc. If the event is anything other than a web page request (step 802), the responder processes the event appropriately (step 803).

If the event is a web page request, and either the pagetype argument is 0 or no pagetype argument is specified (step 804), then the web page request is processed in the conventional manner without generating any audio content. I.e., responder 202 prepares HTML text responsive to the request (step 805). Preparing responsive HTML may mean simply copying HTML text from an HTML file 210 stored in memory 102, or may mean generating HTML text from data in HTML files 210, data in databases, values obtained from other computers, or any of various combinations of these and other sources, as is known in the art. The responsive HTML is then placed on response queue 207, and ultimately transmitted to the requesting client (step 820). The responder 202 then returns to step 801 to get the next event. If the responsive HTML text happens to contain an "audiate" HTML tag, (e.g., the audiate tag is copied from an HTML file 210), the server simply sends the tag to the client along with all the other HTML text, but the server otherwise ignores the "audiate" tag and does not attempt to generate any audio files in response thereto.

If the "N" branch was taken from step 804 (i.e., the event was a web page request, and the pagetype argument was 1, 2, 3 or 4) responder 202 acts according to the pagetype argument as shown. If pagetype is 1 ("Y" branch from step 806), the client is requesting only audio (no HTML text capable of video display). Responder 202 therefore determines whether an "audiate" HTML tag exists in the responsive web page (step 810). This determination will not necessarily require responder 202 to prepare the responsive HTML as it would in step 805, because it is only necessary to know whether an audiate tag would exist if a responsive web page were prepared. Generally, the audiate tag will exist in some HTML file 210 which serves as a formatting basis for the prepared response. But rather than parse such a file, it is preferred that responder 202 maintain an array of flags in memory, each flag corresponding to a web page which may be requested and indicating whether an audiate tag exists for the web page. If an audiate tag does not exist, responder 811 generates a message to be sent to the client, to the effect that there is no audio version of the requested web page (step 811), places the message on response queue 207 for transmission to the client (step 820), and continues to step 801 to get the next event.

If, at step 810, an audiate tag exists, responder 202 examines the contents of any audiate tag(s). If the audiate tag references a wave file 211, i.e., uses the wave parameter (the "Y" branch from step 812), the wave file 211 is fetched and incorporated into the response (step 818). If the audiate tag references text fields, i.e., uses the elements parameter (the "N" branch from step 812), the corresponding text fields are accessed, and the data is converted to audio (i.e., a wave file) using text-to-speech converter 203 (step 813). This wave file is then incorporated into the response (step 818). This response is then put on the response queue for transmission to the client (step 820), and responder 202 returns to step 801 to get the next event. In the preferred embodiment, each audiate tag statement contains a wave parameter or an elements parameter, but not both. The HTML response may contain multiple audiate tags, so that an audio version of a web page may comprise a combination of interleaved or non-interleaved wave files having fixed, pre-recorded sound, and text data which frequently changes and is converted to speech (sound). For clarity of illustration, FIG. 8 shows steps 812, 813 and 818 being performed at most once for each web page request, but in fact step 812 would be performed for each audiate tag in the web page, so that for some tags the "Y" branch may be taken and others the "N" branch may be taken.

If the "N" branch from step 806 is taken, and the pagetype is 2 (step 807), the client is requesting both the conventional video HTML text version and the audio version of the web page. Responder 202 therefore prepares the HTML text in the conventional manner (step 809). The actions taken by responder 202 in step 809 are the same as those taken in step 805, described above. Responder then continues to step 810 to generate the audio version of the response.

If the "N" branch from step 807 is taken, the pagetype is either 3 or 4, meaning that the client is requesting a forced audio version of the web page. I.e., the client is requesting an audio version, whether or not an audiate tag defining such a version exists. Such a pagetype is to be distinguished from either 1 or 2, which request only an audio version of the web page defined by one or more audiate tags, and if such a version does not exist, the server returns a message to that effect (step 811). At step 808, responder determines whether the pagetype is 3 ("Y" branch) or 4 ("N" branch). If the pagetype is 4, the client is requesting both the audio and the conventional HTML text version of the web page; therefore responder prepares the conventional HTML text version at step 814, this step being essentially the same as steps 809 and 805. In case of either pagetype 3 or 4, responder 202 then determines whether an audiate tag exists in the web page HTML (step 815), which is essentially the same as the determination made in step 810, described above. If such an audiate tag exists, responder continues to step 812, processing the request in the same manner as it would a pagetype of either 1 or 2. If no audiate tag exists, responder converts the HTML text version of the web page to audio (a wave file) using text-to-speech converter 203 (step 816). The wave file is then prepared for sending to the client (step 818), placed on the response queue 207, and transmitted (step 820).

Naturally, if web content is to be converted to audio, it is preferable that the web page designer consider how the content is best formatted in audio form. Just as a radio broadcast is not necessarily the same as a television soundtrack of the same subject matter, it is to be expected that a web page version which is specially formatted for audio will not necessarily be a verbatim rendition of all the text on the conventional video version of the web page. The presence of an audiate HTML tag indicates that the web page designer has indeed considered how to format the web page for audio presentation, and so this formatting should be used whenever it is available. Where it is not available, the present pagetype definitions give the client two choices: the client may forego audio altogether, or may request that the standard video version of the web page be converted to audio. It is probable that in some cases, simple conversion of the video version to audio using a text-to-speech converter will yield results which are awkward or difficult to comprehend. However, it must be recognized that in some usages, the client will be willing to accept these limitations rather than have no audio at all.

The alternative audio format of a web page and a web page server which provides the same on request of a client has as described above have many potential uses. One possible use is for audible presentation of web page content in the background of a user's workstation, while the user is working on other tasks. Specifically, web page content may be audibly presented to the user at intervals, or when a change is detected in the content. For example, a user may wish to follow a sporting event or receive current market reports, without interrupting the task in which he is engaged.

Such as use is described in greater detail in commonly assigned co-pending application Ser. No. 09/490,747, to Cary L. Bates, et al., entitled "Method and Apparatus for Audible Presentation of Web Page Content", filed on the same date as the present application, which is herein incorporated by reference. In the preferred embodiment described therein, the browser converts web page text to audio. Thus, the preferred embodiment described therein does not depend on the existence of alternative audio formatted web page content on the server. However, if the server supports such an alternative audio format, the browser could play it rather than convert text to speech itself.

In accordance with the preferred embodiment of the present invention, the web page designer may optionally specify conditions for audibly presenting web page content in the audiate statement. The audiate statement is transmitted to the client with the requested web page, and the client then stores the parameters of the audiate statement in audio script file 323. These parameters become the script for repeating the audio version of the web page at intervals, or when the web page changes, as described more fully in the above referenced patent application "Method and Apparatus for Audible Presentation of Web Page Content".

Another alternative use of such an alternative audio version of a web page is in a portable web accessing device. Frequently, such portable devices have limited video display capability, so that viewing an entire web page in the manner envisioned by the web page designers is difficult or impossible. Furthermore, because such devices are portable, they may be used in automobiles, while walking, performing household chores, shopping, during some types of recreational activities, etc. In such circumstances, audio presentation of web page content may be far preferable to video presentation; in fact, audio presentation may be the only practical means by which the user can receive web page content and perform some other task simultaneously. In this alternative use, it would be expected that browsers or other internet accessing software within such devices have the capability of automatically requesting audio content of web pages from servers (e.g., through an option that the user can turn on and off, or, if the nature of the device permits only audio reception, the request for audio could be hardcoded in the client software).

Another potential use of audio is for learning to read or learning foreign languages. In this case, the simultaneous display of text on a workstation display 311 and rendering the text in audio form improve the capability of the user to retain what is being taught. Therefore, for this particular application, it is expected that the client will typically request both video and audio versions of the same web page.

In the preferred embodiment, a new URL argument "pagetype" and a new HTML tag "audiate" are defined, having certain values or parameters. It should be understood that these are merely arbitrary names for a URL argument or an HTML tag having the functional characteristics described herein, and that virtually any name could be used for these operators or their associated parameters. As used herein, a "pagetype" URL argument and an "audiate" HTML tag should be taken to include any URL argument or HTML tag performing the same or similar function, regardless of how named.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as data storage device 104 or memory 102, and in FIG. 3 as data storage device 314 or memory 302.

Although a specific embodiment of the invention has been disclosed along with certain alternatives, it will be recognized by those skilled in the art that additional variations in form and detail may be made within the scope of the following claims:

What is claimed is:

1. A method of providing information from the web, comprising the step of:

receiving a request for a web page of a web server, the request coming from a web client, the request including an audible formatting parameter specifying whether web content should be returned in an audible format;

returning the requested web page in a first format which includes audible content if said audible formatting parameter requests an audible format;

returning the requested web page in a second format which does not include audible content if said audible formatting parameter requests no audible format;

wherein said web page is represented by an HTML file having a plurality of MTML tags, wherein at least one of said HTML tags is an audiate tag defining said audible content;

wherein said audiate tag has at least one parameter, said at least one parameter including a wave parameter specifying a wave file containing sound, said wave file to be included in a response in said first format and not to be included in a response in said second format.

2. A method of providing information from the web, comprising the steps of:

receiving a request for a web page of a web server, the request coming from a web client, the request including an audible formatting parameter specifying whether web content should be returned in an audible format;

returning the requested web page in a first format which includes audible content if said audible formatting parameter requests an audible format;

returning the requested web page in a second format which does not include audible content if said audible formatting parameter requests no audible format;

wherein said web page is represented by an HTML file having a plurality of HTML tags, wherein at least one of said HTML tags is an audiate tag defining said audible content;

wherein said audiate tag has at least one parameter, said at least one parameter including an elements parameter specifying at least one text field to be converted to audible speech, said audible speech to be included in a response in said first format and not to be included in a response in said second format.

3. The method of claim 2, wherein said audible formatting parameter is an argument to a URL of said web page, said argument assuming one of a plurality of values, wherein a first value of said argument signifies that the requested web page should be returned in an audible format, and a second value of said argument signifies that the requested web page should be returned in video format without audio.

4. The method of claim 3, wherein said first value of said argument signifies that the requested web page should be returned in said audible format only, without video, and wherein a third value of said argument signifies that the requested web page should be returned in both audible format and video format.

5. A computer program product for providing web page content in a server computer coupled to the Internet, said computer program product comprising:

a plurality of processor executable instructions recorded on signal-bearing media, wherein said instructions, when executed by said processor, cause said server computer to perform the steps of:

receiving a request for a web page, the request coming from a web client, the request including an audible formatting parameter specifying whether web content should be returned in an audible format;

returning the requested web page to the web client in a first format which includes audible content if said audible formatting parameter requests an audible format; and returning the requested web page to the web client in a second format which does not include audible content if said audible formatting parameter requests no audible format;

wherein said web page is represented by an HTML file having a plurality of HTML tags, wherein at least one of said HTML tags is an audiate tag defining said audible content;

wherein said audiate tag has at least one parameter said at least one parameter including an elements parameter specifying at least one text field to be converted to audible speech, said audible speech to be included in a response in said first format and not to be included in a response in said second format.

6. The computer program product of claim 5, wherein said audible formatting parameter is an argument to a URL of said web page, said argument assuming one of a plurality of values, wherein a first value of said argument signifies that the requested web page should be returned in an audible format, and a second value of said argument signifies that the requested web page should be returned in video format without audio.

7. The computer program product of claim 6, wherein said first value of said argument signifies that the requested web page should be returned in said audible format only, without video, and wherein a third value of said argument signifies that the requested web page should be returned in both audible format and video format.

8. A web server for providing web content in response to requests received from clients over the Internet, said web server comprising:

an Internet interface for receiving communications from and transmitting communications over the Internet;

a programmable processor for processing instructions;

a web page responder application executable on said programmable processor, said web page responder application generating web page responses in response to web page requests received from clients, said web page responses being generated in a plurality of formats responsive to a respective formatting parameter specified by each requesting client, said plurality of formats including at least one audible format and at least one non-audible format wherein said web page is represented by an HTML file having a plurality of HTML tags, wherein at least one of said HTML tags is an audiate tag defining said audible content;

wherein said audiate tag has at least one parameter, said at least one parameter including an elements parameter specifying at least one text field to be converted to audible speech, said audible speech to be included in a response in said first format and not to be included in a response in said second format.

9. The web server of claim 8, wherein said audible formatting parameter is an argument to a URL of a requested web page, said argument assuming one of a plurality of values, wherein a first value of said argument signifies that the requested web page should be returned in said audible format, and a second value of said argument signifies that the requested web page should be returned in said non-audible format.

10. The web server of claim 9, wherein said first value of said argument signifies that the requested web page should be returned in said audible format only, without video, and wherein a third value of said argument signifies that the requested web page should be returned in both audible format and video format.

11. The web server of claim 8, further comprising a text-to-speech converter for converting textual web page content to audible speech for inclusion in said at least one audible format.

* * * * *

UNITED STATES PATENT AND TRADEMARK OFFICE
CERTIFICATE OF CORRECTION

PATENT NO. : 6,721,781 B1
DATED : April 13, 2004
INVENTOR(S) : Cary Lee Bates et al.

It is certified that error appears in the above-identified patent and that said Letters Patent is hereby corrected as shown below:

<u>Column 12,</u>
Line 33, "step" should be -- steps --.
Line 45, "MTML" should be -- HTML --.

Signed and Sealed this

Twenty-sixth Day of April, 2005

JON W. DUDAS
*Director of the United States Patent and Trademark Office*